May 3, 1932.  D. S. HAYS  1,856,835
POWER TRANSFERRING MECHANISM
Filed Aug. 31, 1927  2 Sheets-Sheet 1
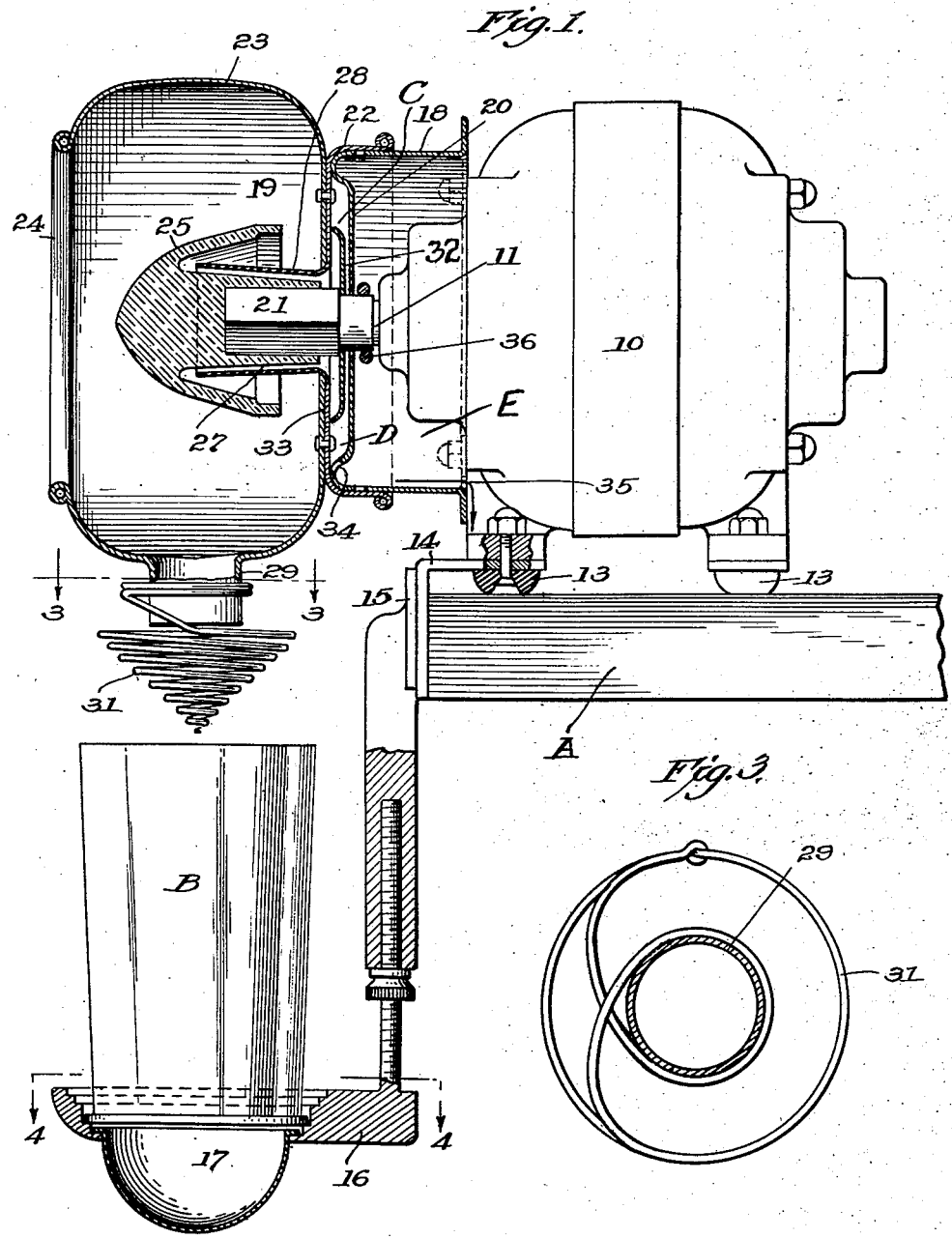
INVENTOR
Donald S. Hays,
BY *Munn &Co.*
ATTORNEYS

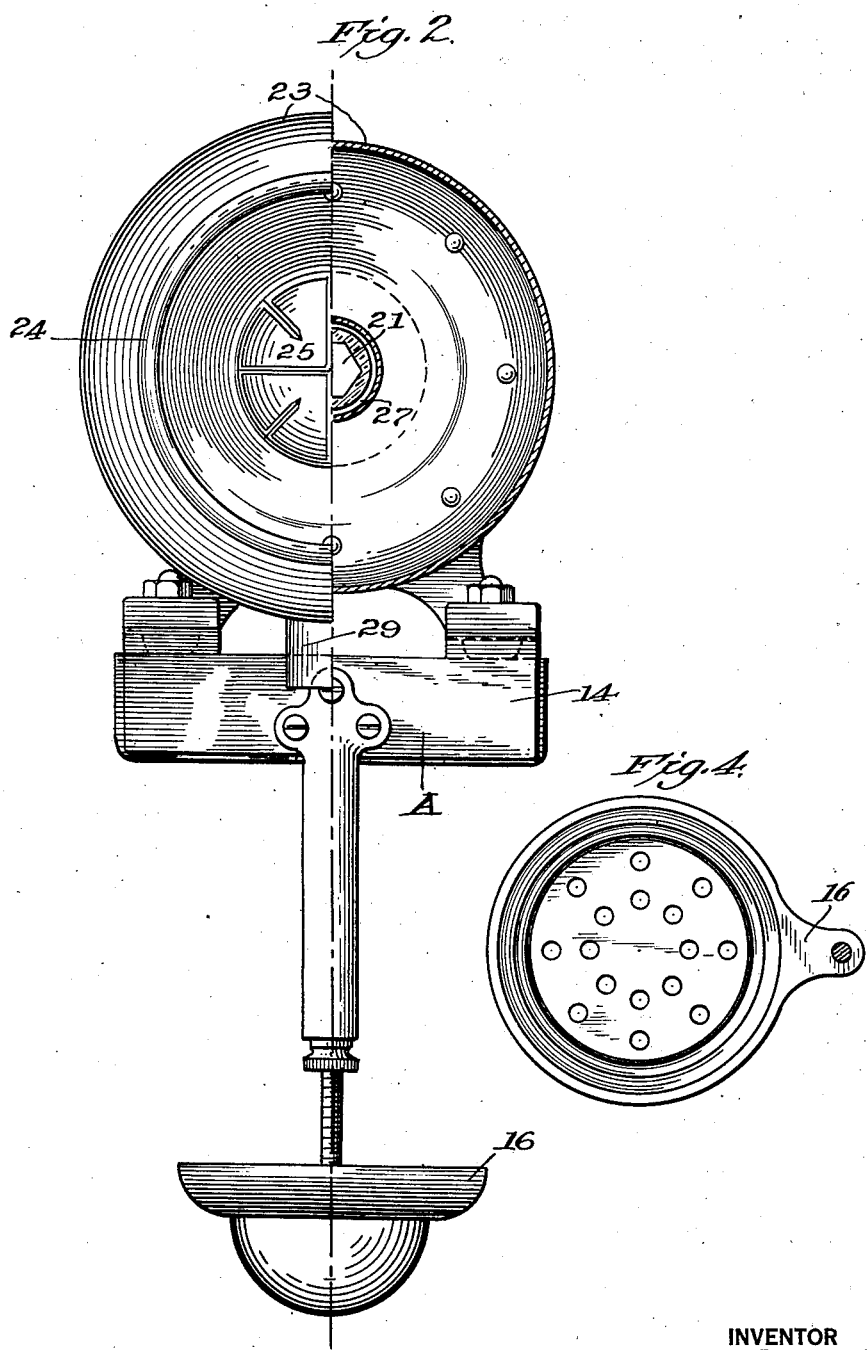

Patented May 3, 1932

1,856,835

UNITED STATES PATENT OFFICE

DONALD S. HAYS, OF ALHAMBRA, CALIFORNIA

POWER-TRANSFERRING MECHANISM

Application filed August 31, 1927. Serial No. 216,769.

My invention relates to power-transferring mechanisms and means to be driven thereby. Notwithstanding the fact that I have brought about a new, novel, and useful combination of driving and driven mechanisms, respectively, that are suitable for a particular or very desirable purpose, I do not wish to be limited as regards the purpose to which the invention is to be put, and, therefore, the invention is essentially directed to new, novel and useful means whereby the transferring mechanism can be quickly correlated to the mechanism to be driven in ways that will effectively complete the power-transferring train between both of said mechanisms.

More specifically, my invention is directed to juice extractors for citrus fruits and has for one of its objects the provision of reliable means for preventing the metallic instrumentalities of the driven motor from being attacked by the acids contained in the juice in the course of extraction.

A further object resides in the provision of means for preventing loss of the juice during the extracting process and for conducting the extracted juice to a suitable receptacle.

A still further object of the invention is to provide a power-transferring shaft which joins a power plant with the juice-extracting burr, and means on the shaft operating as a baffle or trap that will positively prevent the flow of the juice by capillary attraction or otherwise beyond a certain point upon the shaft.

A further object of the invention is to provide means in conjunction with the juice extractor that will deliver the entrapped juice to a place separate from the main point of discharge of the extracted juice.

A further object of the invention is to provide a mechanism of this type which will be simple, light of weight, strong and durable and of a type that will be inexpensive of manufacture.

A still further object of the invention is to provide a mechanism of this type which is extremely compact.

A still further object of the invention is to provide a power-transferring mechanism including a shaft, the latter arranged in association with a fruit juice extractor of the type adapted to operate against the fruit when pressure of the hand is applied against the latter, and means for resisting the effect of manual force applied against the power plant in line with the shaft during the extracting operation, thereby holding the entirety of working devices against sliding movement away from the operator.

A still further object of the invention is to provide a novel combination of mechanism of the character set forth in which the parts thereof can be knocked down conveniently and subjected to a sterilizing or cleansing bath in order that they can be maintained in a sanitary condition.

A still further object of the invention is to provide a novel form of strainer between the bowl of the extractor and the receptacle, into which latter the juice is adapted to be caught as it flows from the bowl.

Other objects and advantages will more fully appear as the description proceeds.

In the accompanying drawings,

Figure 1 is a view in side elevation, with parts in section and parts broken away, of a power-transferring mechanism in association with a driven mechanism;

Figure 2 is a view partly in front elevation and partly in section;

Figure 3 is a section on line 3—3 of Figure 1; and

Figure 4 is a section on line 4—4 of Figure 1.

In practice, use is made of a power plant 10 which is preferably of the electrically operated type whose rotor shaft 11 extends to one side of the housing for the rotor. In this instance, the shaft 11 is horizontally disposed, but it may be arranged at an angle to the horizontal by simply mounting the power plant at the angle selected. This housing is provided with elastic feet 13 adapted to rest upon a counter or other suitable support A. Carried by the housing is a bracket 14 having a vertical flange adapted to come against the forward edge of the counter A where it will co-act therewith to resist the action of force when applied manually to the power plant axially of the shaft 11, all for a purpose which will appear as the description continues. In the present example, the bracket 14 carries an integral depending branch 15 which threadedly accommodates for vertical adjustment a shelf 16 having a drip bowl 17 and a plate or disk, the latter serving as a rest for a glass B or other receptacle.

The power plant 10 is a power-transferring mechanism broadly, and secured to one face of the rotor housing is an annular support and centering means 18 for a hollow body 19 which encloses a driven mechanism. This driven mechanism may be a juice extractor for citrus fruit, as illustrated, or I may elect to employ said power-transferring mechanism in association with other means to which power may be transferred for commercial purposes. However, it will be appreciated that the means 18 includes a head 20 through the center of which is extended the hexagonal end 21 of said shaft 11.

The hollow body 19 comprises a collar 22 and a bowl 23, secured to the collar, and the means 18 removably accommodates the collar so that said means therefore centers the bowl with respect to the shaft 11 and so that the end 21 of the latter is axially positioned within the said bowl. The front of the bowl is formed with a large opening 24 which is designed to permit the hand of the operator to enter therethrough and enable manual force to be applied against the fruit and effect its forced co-active presentation to the driven mechanism shown as a juice-extracting burr 25. This burr carries a hub 27 whose socket mates with the end of the shaft 11. I find that partly through the specific shapes of the shaft end 21 and the socket in the hub 27, the burr can be guided into position upon the shaft quickly and with great convenience.

The collar 22 carries a forwardly extending hollow tube 28 which extends around the hub 27 in spaced relation thereto and completes the means for guiding the hub to its shaft-engaging position.

The base of the bowl 23 is formed with a hollow depending branch 29 which serves as an outlet for the extracted juice, and, as shown, this branch removably accommodates one or more expansive convolutions at the upper end of a substantially conical strainer 31, the same, in this instance, formed from a single piece of wire having its windings spaced apart from one another. This strainer has its apex positioned directly above the receptacle B so that the flowing juice will be caught thereby when the mechanism is in operation. By simply pressing against the diametrically opposite sides of the large end of the strainer, the convolutions thereof can be expanded, and cause their quick embracing connection with the branch 29.

It is known that the acids contained in citrus fruits attack various metals, particularly steel, such as the bearings of the power plant 10 and other essential parts thereof, and to avoid all possibility of injury incident to the action of such acids, I employ the means C herein illustrated. The said means C consists of a baffle disk or centrifugal guard 32, the same secured to the shaft 11 at a point between the head 20 and the crown wall 33, the latter formed as part of the collar 22. This collar is spaced from the head 20 so that the two define a chamber D which communicates at 34 with the chamber E produced by the walls of the means 18. Said means 18 has an escape opening 35 so that as the juice caught by the disk 32 is thrown by centrifugal action into the chamber D, the same will finally take a course through the chamber E, thence through the opening 35. To the rear of the head 20 and embracing the shaft 11 is a ring 36 which functions the same as the disk 32. In this manner, I am able to trap all juice that flows along the shaft 11 and interrupt its flow before it has had an opportunity to enter the casing of the aforementioned power plant.

In operation, the fruit from which the juice is to be extracted is held within the hand of the operator and applied with pressure against the burr 25 so as to break down cellular tissues of the meat of the fruit and thereby and by reason of induced suction cause the juice to be expelled into the bowl 23, where it is discharged into the receptacle B as it flows from the strainer 31. Any juice that is expelled toward the shaft 11 is first and to some extent arrested by the tube 28. Any juice that passes through the tube 28 finds exit at the centrifugal guard 32, which takes it up and distributes it by centrifugal force into the chamber D, and from this chamber the entrapped juice flows to the chamber E and finally escapes from the latter by way of the opening 35. In this manner, I am able to positively guard against passage of this entrapped juice beyond the auxiliary guard disk 36, thereby keeping this juice out of contact with any of the working parts of the motor.

I have stated that the ring 36 functions like the disk 32. By this I mean that, should any juice pass the disk and proceed in the direction of the power plant, it will be caught by the ring and by the action of centrifugal force thrown therefrom into the chamber E, from which it is free to be expelled through the opening 35.

I claim as my invention:

1. In a device of the class described, a motor having a power transferring shaft provided with a free extremity from which power may be distributed to an object to be driven, a housing for said motor, an annular support secured to the housing of the motor and including a head through which said extremity of the shaft extends, the housing having an opening at a point below the longitudinal axis of the shaft through which liquid entering the housing is free to escape therefrom, and a disk carried by the shaft and positioned in advance of the aforementioned head, the head having an orifice positioned with respect to the peripheral edge of the disk so that liquid discharged from the disk by the action of centrifugal force will be directed to the orifice from which it may find egress through the aforementioned opening.

2. In a device of the class described, a motor having a power transferring shaft provided with a free extremity from which power may be distributed to an object to be driven, a housing for said motor, an annular support secured to the housing of the motor and including a head through which said extremity of the shaft extends, the housing having an opening at a point below the longitudinal axis of the shaft through which liquid entering the housing is free to escape therefrom, a disk carried by the shaft and positioned in advance of the aforementioned head, the head having an orifice positioned with respect to the peripheral edge of the disk so that liquid discharged from the disk by the action of centrifugal force will be directed to the orifice from which it may find egress through the aforementioned opening, and a ring embracing the shaft at a point inwardly of the said head and adapted to retard the flow of liquid along the shaft and to discharge same by the action of centrifugal force in the direction of the said opening.

DONALD S. HAYS.